Figure 1:
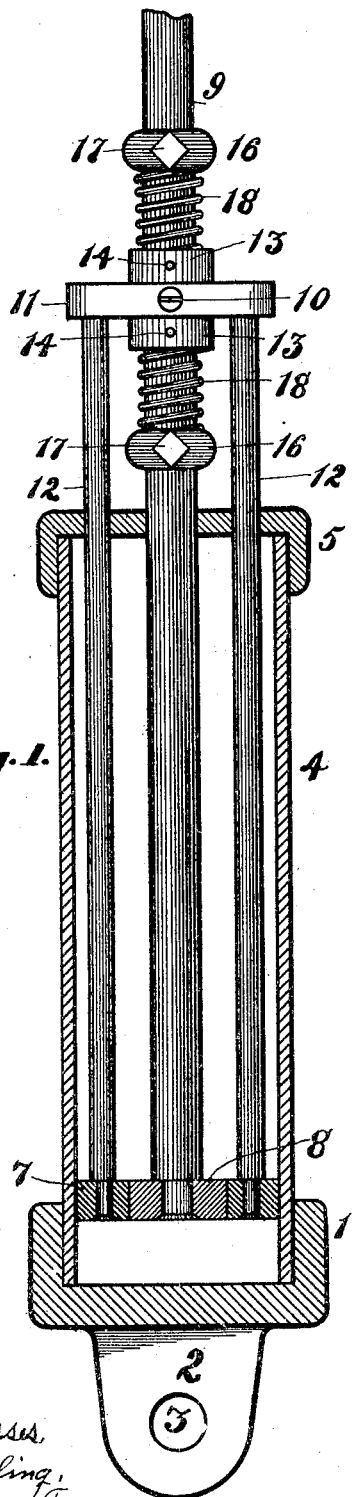

No. 794,312. PATENTED JULY 11, 1905.
M. A. REPLOGLE.
CATARACT CYLINDER AND DASH POT.
APPLICATION FILED SEPT. 26, 1904.

Witnesses
A. E. Kling
Glenard Fox

Inventor
M. A. Replogle
by C. E. Humphrey
Atty.

No. 794,312. Patented July 11, 1905.

UNITED STATES PATENT OFFICE.

MARK A. REPLOGLE, OF AKRON, OHIO.

CATARACT-CYLINDER AND DASH-POT.

SPECIFICATION forming part of Letters Patent No. 794,312, dated July 11, 1905.

Application filed September 26, 1904. Serial No. 226,096.

*To all whom it may concern:*

Be it known that I, MARK A. REPLOGLE, a citizen of the United States, residing at Akron, in the county of Summit and State of Ohio, have invented a certain new and useful Improvement in Cataract-Cylinders and Dash-Pots, of which the following is a complete specification.

My invention has relation to improvements in dash-pots or cataract-cylinders for checking a too sudden movement in a piece of mechanism.

The object of my invention is to provide a dash-pot or cataract-cylinder of the general class mentioned, wherein a piston is arranged to reciprocate in a cylinder partially filled with a fluid, the movement of which around or through the piston offers a check against a too sudden change of position thereof, having an automatic release operable upon the application of an excessive force to the piston-actuating means, such as would endanger the integrity of the mechanism under control of the dash-pot or cataract-cylinder.

This invention is applicable to various forms of mechanism and is primarily designed for use in water-wheel governors, but its use in other forms of machinery requiring the same regulating means is entirely within the scope of this invention.

Experience has shown that the ordinary dash-pot or cataract-cylinder is fairly responsive by ordinary pulsations to the common movements of the means operating the piston-rod, but that upon a sudden access of force to the mechanism depending upon the dash-pot or cataract-cylinder for regulation the speed of the flow of fluid around or through the piston can only be increased to a very limited degree.

Hence the primary object of this invention is to provide a dash-pot or cataract-cylinder sensitively movable in response to its operating medium during ordinary conditions and supplied with means to permit a sudden unusual movement thereof upon emergencies and an immediate return to its former sensitive condition upon a cessation of the extraordinary movement at whatever point of location the piston may have assumed. In attaining this object I provide means in the piston to allow for the transposition of a definite amount of fluid under ordinary conditions and an independent mechanism capable of enlarging or increasing the means for permitting the shifting of position of the fluid operable upon a sudden addition to the force used in moving the piston and which will immediately return to its normal position on a release of the extra force. In accomplishing this object I employ certain novel and peculiar mechanism, one form of which is herein described, reference being had to the accompanying drawings.

Figure 2:
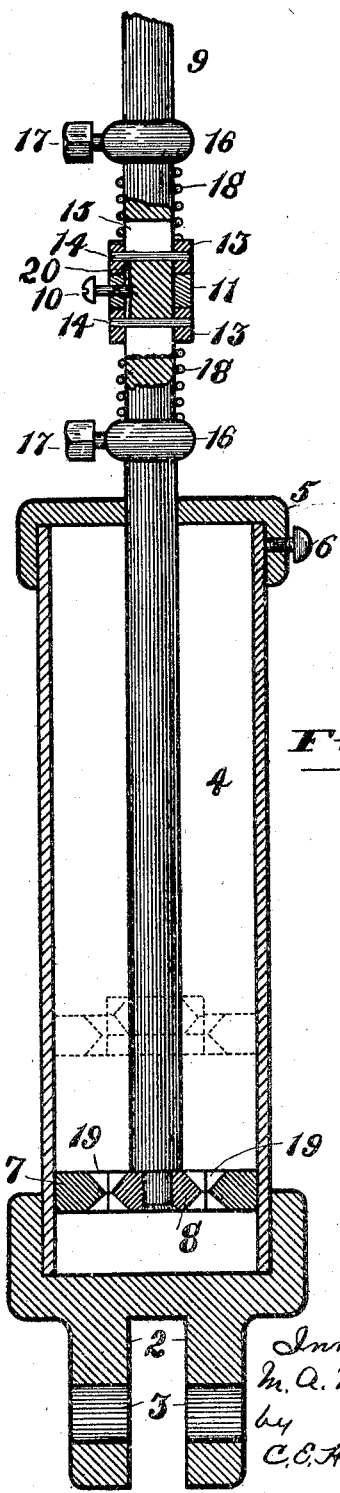

In the accompanying drawings, in which similar reference-numerals indicate like parts in the different figures, Figure 1 is a vertical central section through the center of the dash-pot cylinder, showing its internal construction; and Fig. 2 a similar section on a line at right angles to the section shown in Fig. 1.

In the drawings, 1 is a base or socket having on its lower end ears 2 with bolt-holes 3, by which the device may be attached pivotally to any suitable support. The upper portion of this socket is hollowed out and a vertical hollow cylinder 4 inserted in the opening and held so firmly therein as to insure an air-tight joint therewith. The upper end of the cylinder 4 is closed by a cap or lid 5, held in place by a set-screw 6.

Slidably mounted in the cylinder 4 is a two-part piston consisting of an outer ring 7, which engages the inner surface of the cylinder and is constructed in the form of an annulus, and within the opening in this annular part 7 is the other half 8 thereof. The parts 7 and 8 are of equal vertical width and are designed to be movable vertically with respect to one another, and yet to form when in alinement with each other a unitary piston. The inner part 8 of the piston is mounted on a shaft 9, which passes up through the lid 5, and its upper end is designed to be attached to the mechanism to be controlled by the operation of this device.

Fastened against horizontal revolution on the shaft 9 by a set-screw 10, entering a slot 20, is a yoke 11, depending from which on either side of the shaft 9 are rods 12, the lower ends of which are fastened in the annular portion 7 of the piston. On either side of the yoke 11 and slidable to a limited extent are collars 13. The limiting of the movement of the collars 13 is produced by the following devices: In each collar 13 are pins 14, which project through vertical slots 15, cut in the shaft 9, and so placed that when the collars abut against the top and bottom faces of the yoke 11 the pins 14 will be at the inner ends of the slots 15. In order to normally keep these collars 14 in this position, there is placed on the shaft 9 at approximately equidistant points on either side of the yoke 11 collars 16, capable of an unlimited vertical adjustment on the shaft 9 and held when in proper place by set-screws 17.

Between the collars 16 and the collars 13 are coiled springs 18, the normal tendency of which is to force the collars 13 against the yoke 11. These springs 18 are carefully adjusted by means of the collars 16, so as to exert a certain desired pressure on the collars 13, and this pressure may be changed or altered according to the work required of the dash-pot or cataract-cylinder.

Through the piston in the cylinder 4 are two openings 19 to allow for the passage slowly through the piston of the fluid contained in the cylinder 4 at a certain definite speed as long as the two parts of the piston maintain the position which they occupy in solid lines in the drawings. These openings 19 are conical in shape from the top and bottom of the piston, so that the smaller ends of the cones intersect one another, leaving comparatively small openings in the vertical centers of the openings 19. One half of these openings 19 are cut in the annulus 7 and the other half in the part 8 of the piston. From this construction it will readily be seen that any force which causes the position of the yoke 11 to be varied will alter the position of the parts of the piston with relation to one another, and thereby increase the size of the openings 19 in proportion to the amount of movement which takes place in the position of the yoke 11. In Fig. 2 there is shown in dotted lines the piston with the inner part 8 raised from alinement with the annulus 7 and the manner of its enlarging the openings 19 clearly shown.

The operation of the device is as follows: Assuming the cylinder 4 is partially filled with a relatively slow-moving fluid and the shaft 9, attached to the mechanism, to be controlled by this dash-pot or cataract-cylinder, the piston will reciprocate slightly upward and downward in response to the controlled mechanism and the fluid will pass through the openings 19 slowly when in the position shown in the drawings in solid lines, the size of these openings being sufficient to allow of a comparatively slight movement of the piston as a unit. If for any reason the mechanism controlled by this dash-pot or cataract-cylinder should suddenly exert an unusual extraordinary force either upward or downward upon the shaft 9, the effort of the fluid to pass through the relatively small openings 19 would exert such a pressure upon the part 7 of the piston that it would overcome the resistance of one or the other of the springs 18, thereby causing a change of position of the yoke 11 and the varying of the positions of the parts of the piston with respect to one another to such a degree as to considerably enlarge the capacity of the openings 19, thus enabling the piston to rapidly change its position in the cylinder until it assumes whatever position therein the controlled mechanism might cause, and immediately on reaching this position the springs 18 will return the parts of the piston to their former position and in alinement with one another.

What I claim, and desire to secure by Letters Patent, is—

1. A device of the class described comprising a fluid-containing chamber, a reciprocally-movable member therein consisting of a plurality of parts with a constantly open fluid-passage therethrough, automatically variable in size with the changes in position of the parts of said member longitudinally of said chamber with respect to each other.

2. A device of the class described involving a fluid-containing chamber, a valveless piston therein involving a plurality of parts with a fluid-passage therethrough automatically variable in size with the changes in position of the parts of the piston with respect to each other, the changes in position of the parts of the piston with respect to each other being due to the speed of movement of said piston.

3. A device of the class described involving a cylinder provided with a fluid therein, a two-part reciprocatory piston mounted in said cylinder having a constantly open opening therethrough partly in each portion of said piston and means to automatically cause a change in size of said opening.

4. A device of the class described involving a fluid-containing chamber, a two-part reciprocatory piston in said cylinder, independent means for supporting each part of said piston and means to slidably unite the supports for the parts of said piston.

5. A device of the class described involving a fluid-containing chamber, a two-part reciprocatory piston mounted in said chamber having an opening therethrough partly in both of the portions thereof, independent means to support the parts of said piston, means to slidably unite the supports for the parts of said piston, and means to normally hold the supports and piston parts in a certain definite relation to each other.

6. The combination in a device of the class described of a suitably-supported fluid-containing chamber, a piston consisting of a plurality of parts, each part of which is suitably supported, having a constantly open opening therethrough, the sides of said opening being formed by two of the parts of said piston, said opening being variable in size with the changes in position of the parts of said piston longitudinally of said chamber with respect to each other.

7. The combination in a device of the class described of a fluid-containing chamber, a piston mounted therein consisting of a plurality of parts, a shaft to support one part of said piston, a yoke mounted on said shaft, rods connecting said yoke with other parts of said piston, springs to normally hold said yoke in position on said shaft and the parts of said piston in a certain definite relation to each other.

8. A device of the class described involving a fluid-containing chamber, reciprocatory valveless means mounted in said cylinder made up of a plurality of parts with a fluid-passage therethrough automatically variable in size in direct ratio with the speed of movement of said piston.

9. The combination in a device of the class described of a fluid-containing chamber, a piston mounted therein consisting of a plurality of parts with a constantly-open fluid-passage between them automatically variable in size with the changes of position of the parts of said piston longitudinally of said chamber with respect to each other, means to support the parts of said piston slidably with respect to each other and means to limit the amount of movement of the parts of said piston with respect to each other.

10. The combination in a device of the class described of a fluid-containing chamber, a piston mounted therein consisting of a plurality of parts having an opening therethrough variable in capacity in proportion to the variation in position of the parts of said piston with respect to one another, a support for one part of said piston consisting of a shaft, a yoke slidably mounted on said shaft, means connecting said yoke with the other parts of said piston, collars on opposite sides of said yoke having a limited sliding motion, springs to force said collars against the sides of said yoke, and means to adjust the tension of said springs, all constructed and arranged substantially as shown and described and for the purpose stated.

11. A device of the class described comprising a fluid-containing chamber, a reciprocally-movable member therein consisting of a plurality of parts with a constantly-open fluid-passage therethrough automatically variable in size with the changes in position of the parts of said member with respect to each other due to the speed of the movement of said member.

In testimony that I claim the above I hereunto set my hand in the presence of two subscribing witnesses.

MARK A. REPLOGLE.

In presence of—
C. E. HUMPHREY,
GLENARA FOX.